United States Patent
Bordeleau

(10) Patent No.: US 11,568,510 B2
(45) Date of Patent: Jan. 31, 2023

(54) SYSTEMS AND METHODS FOR SETTING CORRESPONDENCE BETWEEN PIECES OF EQUIPMENT, LOCATIONS AND ELEMENTS OF A LOCKOUT PROCEDURE CHECKLIST

(71) Applicant: Eric Bordeleau, Val-d'Or (CA)

(72) Inventor: Eric Bordeleau, Val-d'Or (CA)

(*) Notice: Subject to any disclaimer, the term of this patent is extended or adjusted under 35 U.S.C. 154(b) by 104 days.

(21) Appl. No.: 17/198,826

(22) Filed: Mar. 11, 2021

(65) Prior Publication Data
US 2021/0350493 A1 Nov. 11, 2021

Related U.S. Application Data

(60) Provisional application No. 63/021,714, filed on May 8, 2020.

(51) Int. Cl.
*G06Q 90/00* (2006.01)
*G06K 1/08* (2006.01)
(Continued)

(52) U.S. Cl.
CPC ............ *G06Q 90/00* (2013.01); *G06F 3/12* (2013.01); *G06K 1/08* (2013.01); *G06K 19/04* (2013.01)

(58) Field of Classification Search
CPC .. G06Q 90/00; G06Q 10/06398; G06Q 10/20; G06Q 10/0633; G06F 3/12; G06K 1/08; G06K 19/04; B26F 1/36
See application file for complete search history.

(56) References Cited

U.S. PATENT DOCUMENTS 3,962,808 A * 6/1976 Ryder ................. G09F 7/00
40/490
4,520,749 A * 6/1985 Jefferson ............. G09B 19/003
116/324
(Continued)

FOREIGN PATENT DOCUMENTS

EP 2590119 A1 5/2013
GB 2089273 A 6/1982

OTHER PUBLICATIONS

Witte Gregg: "Via Alpina Hiking passbook: Stamp it up!", Sep. 25, 2019, XP055844836, retrieved from the Internet: URL:www.alpenwild.com (retrieved Nov. 29, 2021).

*Primary Examiner* — Tuyen K Vo
(74) *Attorney, Agent, or Firm* — Benoit & Côté Inc.; France Côté; Danny Higgins

(57) ABSTRACT

Systems and methods for setting correspondence between pieces of equipment, locations and elements of a lockout procedure checklist comprising a procedure checklist and marking tools. The procedure checklist is printed over a markable support and comprises elements printed thereon each comprising a unique graphical assemblage. Marking tools, provided at locations to perform securing operations on pieces of equipment, are adapted to generate markings on the support matching the graphical assemblages. The operator following each of the elements of the procedure uses the marking tools at the locations to generate markings on the support, and thereby completion of the procedure may be validated by comparing the markings generated on the support with the graphical assemblages thereon. Procedure allows to validate that operations are performed only on appropriate pieces of equipment and location, and that all steps are performed.

20 Claims, 12 Drawing Sheets

(51) Int. Cl.
*G06K 19/04* (2006.01)
*G06F 3/12* (2006.01)

(56) References Cited

U.S. PATENT DOCUMENTS

| | | | | |
|---|---|---|---|---|
| 5,267,147 A | * | 11/1993 | Harshaw | G16H 70/20 |
| | | | | 701/14 |
| 2011/0297075 A1 | * | 12/2011 | Coon | G09F 9/302 |
| | | | | 116/323 |
| 2018/0225616 A1 | * | 8/2018 | Jones | G06N 5/045 |
| 2020/0142556 A1 | * | 5/2020 | Lin | G06F 3/0484 |

* cited by examiner

MOBILE EQUIPMENT
MAIN ENERGY CONTROL PROCEDURE
LOCKOUT

| Organization Name | Procedure No<br>Equipment No<br>Type of equipment |
|---|---|
| Date created<br>Last updated | Approved by<br>Officer in charge |

Consult the manufacturer's manual before performing certain tasks

DESCRIPTION OF MOBILE EQUIPMENT

| Make<br>Model<br>Maintenance shop | Year<br>Licence Plate No |
|---|---|

Location or devices to be operated for procedure (photos or illustrations)

GENERAL INSTRUCTIONS

| Mandatory protective equipment | ☐ Safety footwear<br>☐ Safety goggles | ☐ Work gloves<br>☐ Insulated gloves | ☐ Hard hat<br>☐ Face shield<br>☐ Other - specify |
|---|---|---|---|
| Material required | Personal padlock<br>Hasp<br>Labels<br>Series of padlocks<br>Lockout box | Wheel chocks<br>Circuit tester<br>Batt. term. covers<br>Sign and fast. | Steering wh. cover<br>Valve cover<br>Block. device<br>Other - specify |
| Associated procedures | ☐ Road signs<br>☐ Batt. term. removal<br>☐ Safety instructions | | ☐ Space entry<br>☐ Other energy cont.<br>☐ Bio contaminants<br>☐ Other - specify |

| STEPS FOR ENERGY CONTROL | |
|---|---|
| Tasks in question | Steps to follow |
| INSTRUCTIONS | ACCESSORIES |
| 1 Notify employees concerned about the work | N/A |
| 2 Park on stable, flat ground. Put the transmission on specified position and apply parking brake | N/A |
| 3 Lower the equipment's accessories to the desired position | N/A |
| 4 Shut down the equipment, remove the key and keep possession of the key | N/A |
| 5 Place chocks under the wheels | |
| 6 Chock any accessories that are not on the ground, as well as those specified by the manufacturer | |
| 7 Put up a sign (on the vehicle door or steering wheel) to indicate work in progess | Sign and fasteners |
| 8 Mark the work area | |
| 9 Padlock the battery master switch or disconnect the battery terminals according to procedure. Put cover and padlock | Hasp & (padlock or term. covers) |
| 10 Padlock the other isolating devices | |
| 11 Neutralize residual energy sources | |
| 12 Run a start-up test with the start button or key. In case of start button, lock the cab once test completed. | N/A |
| CONTINUITY OF WORK | |
| If the work cannot be completed, ensure a smooth transition to the next work crew until it has installed its padlocks or proceed according to est. procedure | |
| REMOVING PADLOCKS AND RETURNING TO SERVICE | |
| 1 Make sure the work is finished and the equipment in working order | |
| 2 Check that the safety device removed have been put back in place | |
| 3 Check that controls are in neutral | |
| 4 Check that the work area is clear, and notify people about the restart | |
| 5 Remove lockout devices and other accessories | |
| 6 Start uo the mobile equipment and check that it is running properly | |

102 — brackets rows 1–12 of Instructions

SYSTEMS AND METHODS FOR SETTING CORRESPONDENCE BETWEEN PIECES OF EQUIPMENT, LOCATIONS AND ELEMENTS OF A LOCKOUT PROCEDURE CHECKLIST

CROSS-REFERENCE TO RELATED APPLICATION

This application claims priority from U.S. provisional patent application 63/021,714 filed May 8, 2020, the specification of which is hereby incorporated herein by reference in its entirety.

BACKGROUND

(a) Field

The subject matter disclosed generally relates to the field of lockout, aka securing, procedures and systems. The present disclosure relates more specifically to the use of visual technology to improve securing procedures and systems.

(b) Related Prior Art

In some applications, certain areas or equipment call for multiple processes to occur before granting access or restricting access from zones or equipment. These multiple steps are often intended to help ensure that a safety process is properly completed. Lockout or securing systems are used to support such processes.

Once a potentially dangerous piece of equipment is turned off, for example, the switch for the equipment may be locked out (e.g., using a hasp having multiple apertures) using multiple padlocks. Each padlock typically prevents movement of the hasp and each padlock typically represents a step, aka process, of a safety procedure. Tags are typically placed on the equipment to, e.g., warn users that the piece of equipment is not to be used. When a safety procedure is completed, an associated padlock can be removed by the appropriate personnel. A policy is often established such that only the user that placed a lockout tag and padlock can remove the lockout tag and padlock. Often, the multiple steps at that stage are also required in a precise order.

In practice, tags and padlocks are typically of different colors so that steps or personnel responsible for the tags and locks may be identified. Lockout systems are conventionally communicated, tracked, and monitored using manual processes.

In other contexts, a lockout procedure comprises generally two types of elements to identify and validate, namely the articles to be used to insulate, to isolate and or to eliminate the source of dangerous energy according to a process provided on a procedure checklist, and a zone to be secure once all the processes of the procedure checklist are followed, wherein the secured zone is normally, e.g., a work area associated with a piece of equipment or a machine.

Difficulties encountered with lockout procedure include difficulty for the operator to efficiently and with a very low failure-level to validate correspondence between the pieces of equipment and/or locations listed on the procedure checklist and the physical pieces of equipment and/or locations in the workplace, with each failure in successfully performing correspondence resulting in increases risks for the operator. In practice, if a process of the procedure checklist is ill-performed, for example over a circuit cutting point, the associated dangerous energy source remains to provide risks in the assumedly secured zone. The same risks result also from an ill-determination of the location of the secured zone.

To respond to these problems, many solutions are nowadays employed in the industry. However, these solutions have important drawbacks, some regarding the costs to put in place these solutions and/or to maintain the solutions, some of them with the difficulty or the extra work associated with using these solutions. The latter in practice results frequently in a portion of the operators failing to follow the securing procedure, and thus failing in securing the zone where they are working.

As an example of such a nowadays solution, it is possible to, e.g., add additional energy source cutting means close to the zone to be secured, which allow decreasing the risks of confusion regarding the energy shut down points. However, this kind of solution is costly to install. Furthermore, the additional energy source cutting means, as any piece of equipment, feature risks of future failures that may negatively influence the production capacity of the workplace in the future, that may increase the difficulty to identify the nature of failures and that may increase costs and maintenance requirements. Finally, an increase in the number of pieces of equipment to be under lockout also increases the chances of any one of these pieces of equipment being forgotten at the time to remove the lockout from the pieces of equipment, which would automatically result in delays in production on the workplace.

Another example is the use of light signals associated with dangerous energy sources. Before reaching a secured zone, an operator must validate the state of the light signal(s) associated with the energy source associated with the zone. Usually, the light source is visible from the vicinity of the secured zone. Therefore, when about to work in the secured zone, an operator checks the state of the light signal(s), and if not depicting a safe condition, the operator will have to leave the to-be-secured zone to reach the piece of equipment allowing to control the dangerous energy source before returning to the secured zone, what may sum up to a lot of displacement. Furthermore, this solution is costly to install, requiring once again more complex electric circuits increasing with the distance between the piece of equipment used to control the energy source and the zone to be secured.

In the particular case when two operators have to work in the same secured zone, based on distinct lockout protocols, the process becomes even more complex. For example, it is complex for the second operator to determine the specific steps of the lockout procedure to perform versus already performed by the first operator. And if the first operator leaves the parameter while the second operator is still working, will the first operator put at risk the operator still working on the piece of equipment by freeing from lockout pieces of equipment identified in his lockout procedure? Thus, risks remain with the present solution nowadays available.

Therefore, that solution provides numerous drawbacks, including that in some cases the selected solution does not match the daily routine and requirements of the operators. For example, such a solution may result when a machine is under maintenance between shifts resulting in confusion in the states of lockout or not at the beginning of the following shift.

A technique involving a starting test is frequently used in the industry. This technique requires the installation of local starting controls for the equipment close to the work area. Such installation is costly to install since these controls must always be free of interlock, e.g., with industrial automates and emergency stop controls. This technique does not allow to eliminate the risks of errors since, during maintenance stops, all of the machines are stopped, which renders lockout processes upstream very difficult to test. An outcome of this is a potentially dangerous confusion resulting from multiple lockouts at different points along the energy line(s) feeding a machine.

In order to mitigate the risks of confusion, some companies require to perform a starting test over a machine before performing a lockout process, which results once again in costs and delays.

Thus, all of these solutions have drawbacks having variable results ranging from increased costs, decreased productivity, increased sources of confusion, a decrease of the engagement of the operators in following the procedures and increased risks, which is opposed to the object of these procedures to eliminate or at least to mitigate these risks.

There is therefore a need for a simpler and less expensive solution that will provide aid to the operators to follow the different processes and elements of a securing procedure and to validate that both all of the elements and all the right pieces of equipment are under lockout at the end of the securing procedure. Finally, the solution will provide aid to the operators to validate that they are working in the right secured zone at the end.

SUMMARY

According to an embodiment, their novel solution aims to provide systems and methods of validation of correspondence between pieces of equipment and a procedure checklist in a lockout process.

More precisely, according to an embodiment, the novel solution aims to provide systems and methods that allow validating the correct match between points, steps or other information of a security procedure with either a) a piece of equipment or b) a location is identified and the physical piece of equipment or location corresponding to the process listed in the securing procedure.

According to an embodiment, there is provided a system for validating, using a procedure checklist, that a procedure is followed by an operator. The system comprises the procedure checklist printed over a markable support, comprising a first element printed thereon comprising a first graphical assemblage; and a second element printed thereon comprising a second graphical assemblage that is different from the first graphical assemblage. The system further comprises a first marking tool adapted to generate markings on the support matching the first graphical assemblage, wherein the first marking tool is provided at a first location associated with the first element of the procedure checklist; and a second marking tool adapted to generate markings on the support matching the second graphical assemblage, wherein the second marking tool is provided at a second location associated with the second element of the procedure checklist. The operator following each of the elements of the procedure uses the marking tools at the locations to generate markings on the support, and the following of the procedure is validated by comparing the markings generated on the support with the first graphical assemblage and the second graphical assemblage.

According to an aspect, the first element comprises an identifier used to identify one of a piece of equipment and a location associated with the element.

According to an aspect, the first element comprises a description of a first operation of the procedure.

According to an aspect, wherein the first operation is to be performed at least one of a) on the piece of equipment and b) at the location associated to the element.

According to an aspect, the marking tools are attached at the location.

According to an aspect, the markings comprise one of printing and punching.

According to an aspect, the markings comprise reference marking common to markings of the first marking tool and the second marking tool.

According to an aspect, the first marking tool comprises a matrix of pins capable of perforating the markable support.

According to an aspect, the markable support comprises one of a cardboard, a sheet of paper and a sheet of laminated paper.

According to an aspect, the system further comprising a padlock to be installed at the first location.

According to an embodiment, a method for an operator to perform a procedure following a procedure checklist comprises providing the operator with the procedure checklist. The procedure checklist comprises a first element comprising a first operation description and a first graphical assemblage; and a second element comprising a second operation description and a second graphical assemblage that is different from the first graphical assemblage. The method comprises for each of the elements of the procedure checklist, having the operator: accessing a location associated with the element; performing the operation described in the element; and generating markings associated with the element of the procedure checklist with a marking tool available at the location. Following of the procedure is validated by comparing the markings generated over the procedure checklist with the patterns.

According to an aspect, the procedure of the procedure checklist is to be performed one of a) on a piece of equipment and b) at the first location.

According to an aspect, marking the element of the procedure checklist comprises one of a) printing on the markable support and b) punching the markable support.

According to an aspect, the marking the element of the procedure checklist comprises generating reference markings on the markable support, wherein the reference markings are common to the markings to be generated with the first marking tool and the markings to be generated with the second marking tool.

According to an aspect, the method further comprises validating the following of the procedure by the operator, for each of the elements of the procedure checklist, by comparing the markings generated over the procedure checklist with the graphical assemblages of the procedure checklist.

According to an aspect, the procedure checklist is one of a) printed on one of a cardboard, a sheet of paper and a sheet of laminated paper and b) stored in memory of an electronic device.

According to an embodiment, a method of generating a first procedure checklist comprises: gathering a list of operations to be performed at different locations during a procedure; and generating the first procedure checklist comprising a list of elements, each one of the elements comprising: a description of an operation to be performed at a location from the list of operations; and a unique graphical assemblage associated with the location of the operation to be performed. The method further comprises inscribing the first procedure checklist on a markable support transferrable to an operator. At each location where one of the operations of the list of operations is to be performed, a marking tool adapted to generate markings on the markable support matching a graphical assemblage is available. Each one of the marking tools is adapted to generate the unique graphical assemblage associated with its location. Thereby following of the procedure is validated by comparing the markings generated over the first procedure checklist with the graphical assemblages.

According to an aspect, each one of the elements comprises an identifier used to identify at least one of a) a piece of equipment and b) one of the locations.

According to an aspect, inscribing the first procedure checklist comprises one of a) printing the first procedure checklist on one of a cardboard, a sheet of paper and a sheet of laminated paper, and b) loading the first procedure checklist in memory of an electronic device.

According to an aspect, the method further comprises generating a second procedure checklist from the list of operations, wherein the first procedure checklist comprises description of all of the operations of the list of operations less remainder operations, and wherein the second procedure checklist comprises an element comprising a reference to the first procedure checklist and additional elements comprising descriptions of the reminder operations.

According to an embodiment, the system comprises concomitant use of:
  i. a procedure checklist in which are provided details of a procedure comprising:
    i-a. the location(s) and associated piece(s) of equipment to be secured;
    i-b. the location of the zone(s) to be secured through the procedure;
    i-c. the articles to be used to eliminate, to isolate from, or to mitigate identified sources of danger, aka dangerous energy sources; and
    i-d. a unique pattern, identifier or other correspondence means associated with the location and/or piece of equipment to be secured and to the zone(s) to be secured;
  with
  ii. a set of tools, aka marking tool (physical or electronic), wherein each one of the tools is associated with a single one of the location(s), the piece(s) of equipment and/or with the zone to be secured, and wherein each one of the tools provides means of validation of correspondence between the piece of equipment, location or zone and either ii-a. the associated process(es) of the securing procedure to be performed on said piece of equipment or at said location; and ii-b. the identified zone to be secured according to the securing procedure;
wherein each one of the tools is adapted to provide visual means over the procedure checklist in association with the element, and thus the piece of equipment, the location and/or the zone in such a way:
  a. that the correspondence between the piece of equipment, the location and/or the zone and the element listed on the procedure checklist can be visually validated;
  b. that a visual proof on the checklist remains afterwards that the element, e.g. securing process, listed on the procedure checklist associated with the piece of equipment or location have been performed; and
  c. that all the elements of the procedure checklist have been passed through, and thus that the objective of the procedure, namely to secure the zone identified on the securing procedure checklist, has been reached.

According to an aspect, securing procedure checklist and marking tools are provided within a working environment with an operator using the marking tool available at the location of each of the piece of equipment or location listed on the procedure checklist before or after having performed the processes associated therewith on the procedure checklist, and to repeat these steps for all of the pieces of equipment and/or locations listed on the procedure checklist. When following the procedure checklist and at the completion of all of the processes listed on the procedure checklist, the operator can compare the pattern on the procedure checklist with the markings performed thereon when following the procedure checklist to determine if any failures have occurred in relation to the elements of the procedure checklist by either
  a) failing to visit and/or perform the security processes associated with one of the pieces of equipment and/or location;
  b) visiting the wrong piece of equipment and/or location;
  c) failing to have visited and/or perform the security processes associated with all of the piece(s) of equipment and/or location(s) listed on the procedure checklist.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 1A and 1B are sheets of an exemplary securing procedure checklist in accordance with the PRIOR ART;

It will be noted that throughout the appended drawings, like features are identified by like reference numerals.

DETAILED DESCRIPTION

Figure 2A:
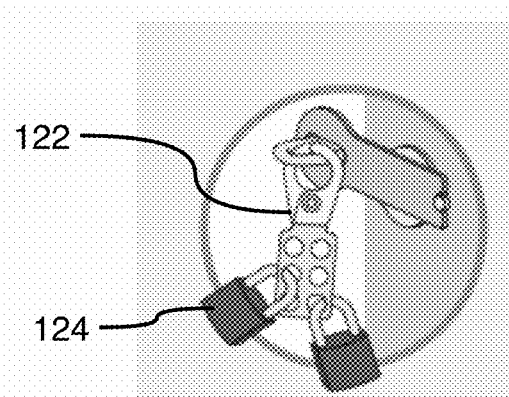
FIG. 2A depicts a piece of equipment under lockout using a hasp and a padlock.

Before turning to the description and the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

First, to understand the present description, one must have a broad grasp of a lockout (securing) procedure. A securing procedure or, failing that, "any other method that ensures equivalent safety" must be followed for work in a machine's danger zone. The types of work in question are installing, servicing, maintaining, adjusting, cleaning, inspecting, unjamming, setting up, and decommissioning. The goal of these methods is to prevent any untimely release of energy that could cause an accident in the course of the work. The steps involved in a securing procedure are: 1—deactivation and complete shutdown of the piece of equipment; 2—elimination or, if that is impossible, control of the residual or stored energy source(s); 3—lockout of the piece of equipment's energy source cut-off points; 4—verification of lockout using one or more techniques to reach the highest level of effectiveness; and 5—safely unlocking and re-operating the piece of equipment.

The present innovation aims to provide a solution for the above procedure and aims more specifically to the preceding steps 3 and 4.

The realizations will now be described more fully hereinafter with reference to the accompanying figures, in which realizations are illustrated. The foregoing may, however, be embodied in many different forms and should not be construed as limited to the illustrated realizations set forth herein.

It should be noted that for purposes of this disclosure, the expression "graphical assemblage" means a visually recognizable assembly of individual graphical components assembled in a recognizable pattern.

It will be noted that throughout the appended drawings, like features are identified by like reference numerals.

A securing procedure comprises a series of elements, aka steps or points, with action(s) to perform in relation to each of the points. Examples of material required to complete actions comprise padlocks, hasp, labels, lockout boxes, circuit testers, etc. Examples of actions to complete a securing procedure comprise an area to lock, a motor or breaker to turn off and lock, a wire to insulate and lock, a valve to turn and lock, a battery to test, battery terminals to cover, a sign to install. The completion of the securing procedure, therefore, comprises to pass through all of the elements of the securing procedure with all actions comprised in each of these elements being performed.

Referring now to FIGS. 1A and 1B, the prior art consists of a securing procedure checklist 100 with the elements 102 to be completed, wherein, for each element 102, an identifier of a piece of equipment involved, e.g., S102V, is provided. Such a securing procedure checklist 100 is provided to the operator having to perform a task in a secured zone.

It must be noted that in the exemplary securing procedure checklist 100, since the task is relative to a mobile vehicle, no unique identifier is provided. However, in other situations, e.g., a plant, the securing procedure checklist 100 may comprise unique identifiers since numerous similar pieces of equipment, sometimes located close to another, are present.

When following the securing procedure checklist 100, for example, for each of the elements 102 on the securing procedure checklist 100, the operator operates the piece of equipment as required, and use when recited a securing article, e.g., installing a padlock thereon and/or installing a tag, and go to the next element 102 of the securing procedure checklist 100.

Figure 2B:
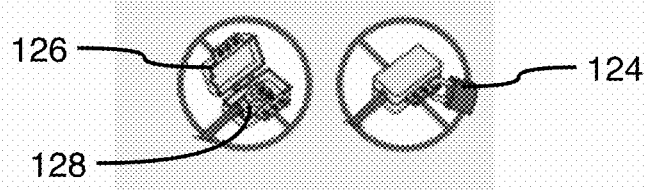
FIG. 2B provides an example of a piece of equipment before being under lockout, with a battery connector accessible, and under lockout with the battery connector locked out in a box kept closed with a padlock.

FIGS. 2A and 2B provide examples of such securing article. FIG. 2A depicts a piece of equipment under lockout using a hasp 122 and padlocks 124. FIG. 2B provides an example of a piece of equipment before being under lockout, with a battery connector 128 accessible, and under lockout, with the battery connector 128 locked out in a lockout box 126 kept closed with a padlock 124.

Figure 3:
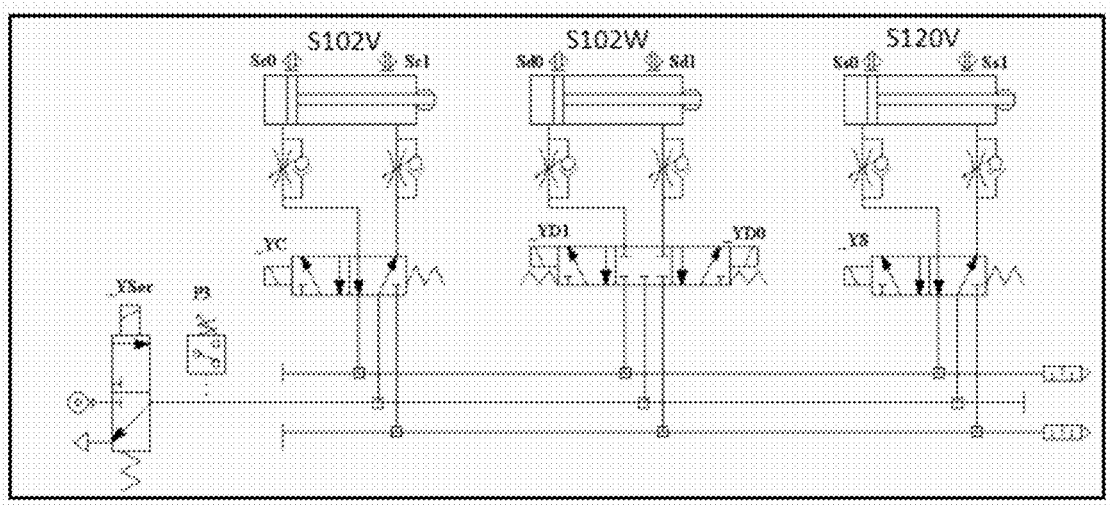
FIG. 3 is a schematic of a system comprising a plurality of valves.

As stated, there is sometimes easy for the operator to confuse pieces of equipment, regardless of the visibility of an identifier on the piece of equipment. For example, two valves may be identified S102V and S102W, with the confusion between the two resulting in potentially dangerous conditions for the operator since, for example, residual energy may remain in the piece of equipment to be the object of maintenance, and thus the zone to be secured is not at the end. The nature of the confusing pieces of equipment may vary from similar components in different locations to a series of similar pieces of equipment requiring different states (open vs closed), see FIG. 3 for example of an environment involving valves.

Figure 4:
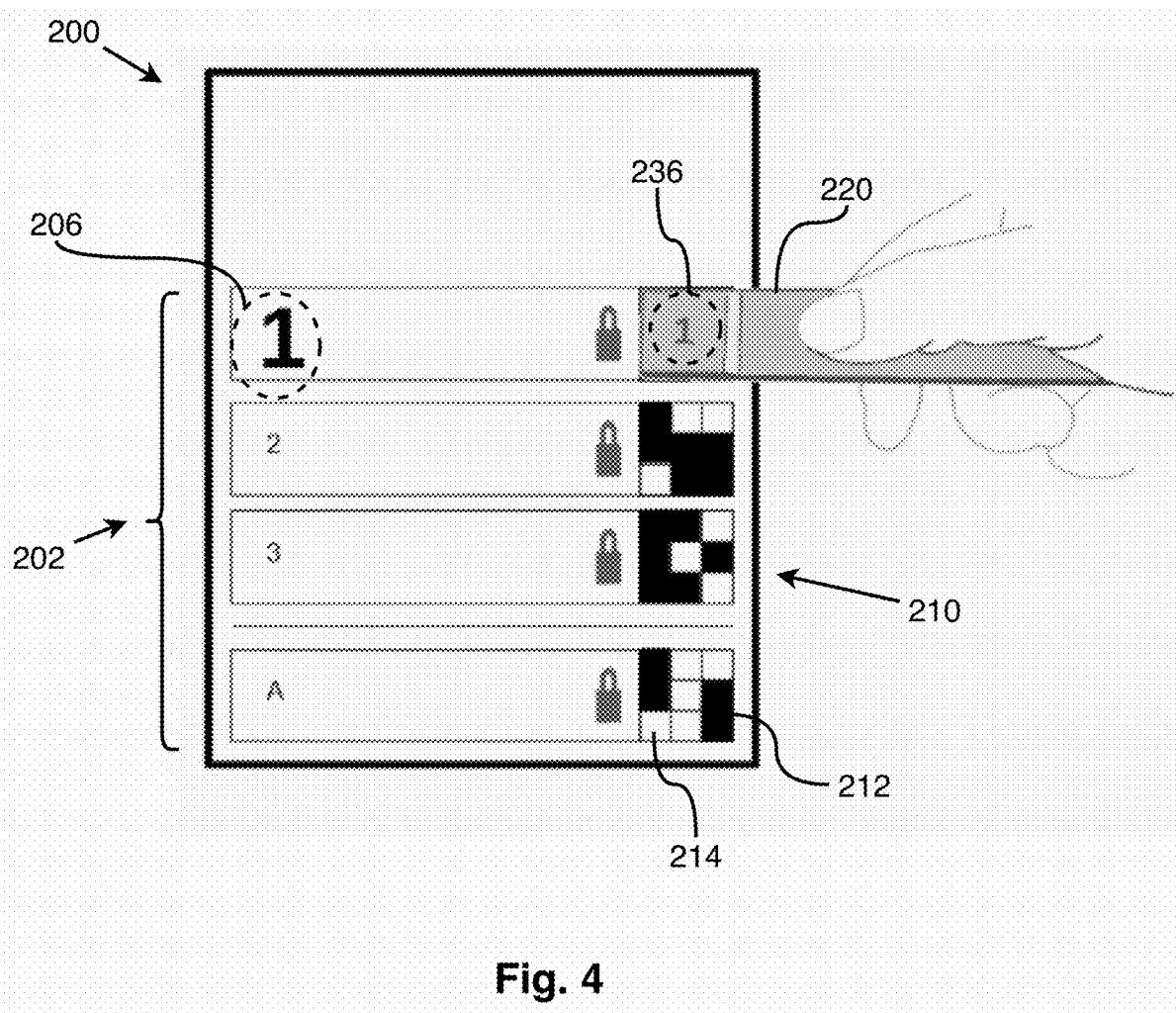
FIG. 4 is a securing procedure checklist and an associated marking tool in accordance with an embodiment.
Figure 5A:
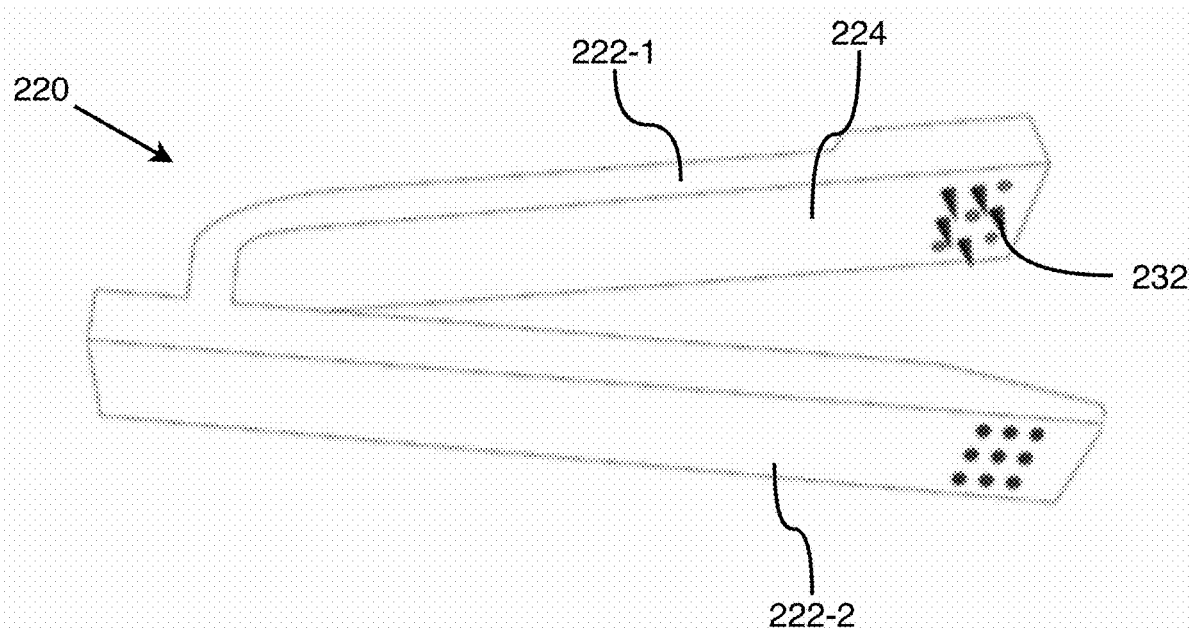
FIGS. 5A and 5B are perspective views of a marking tool in accordance with an embodiment.
Figure 5B:
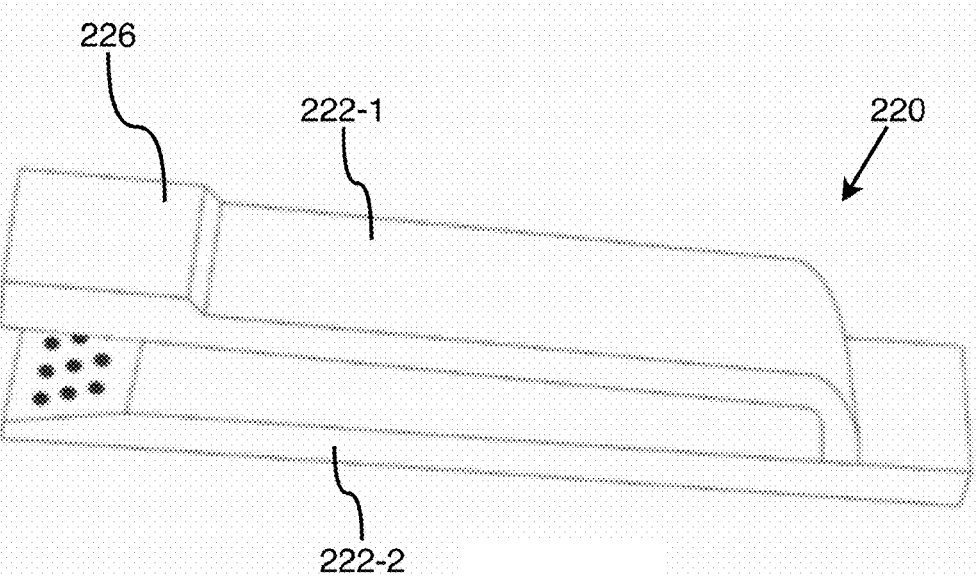
Figure 6:
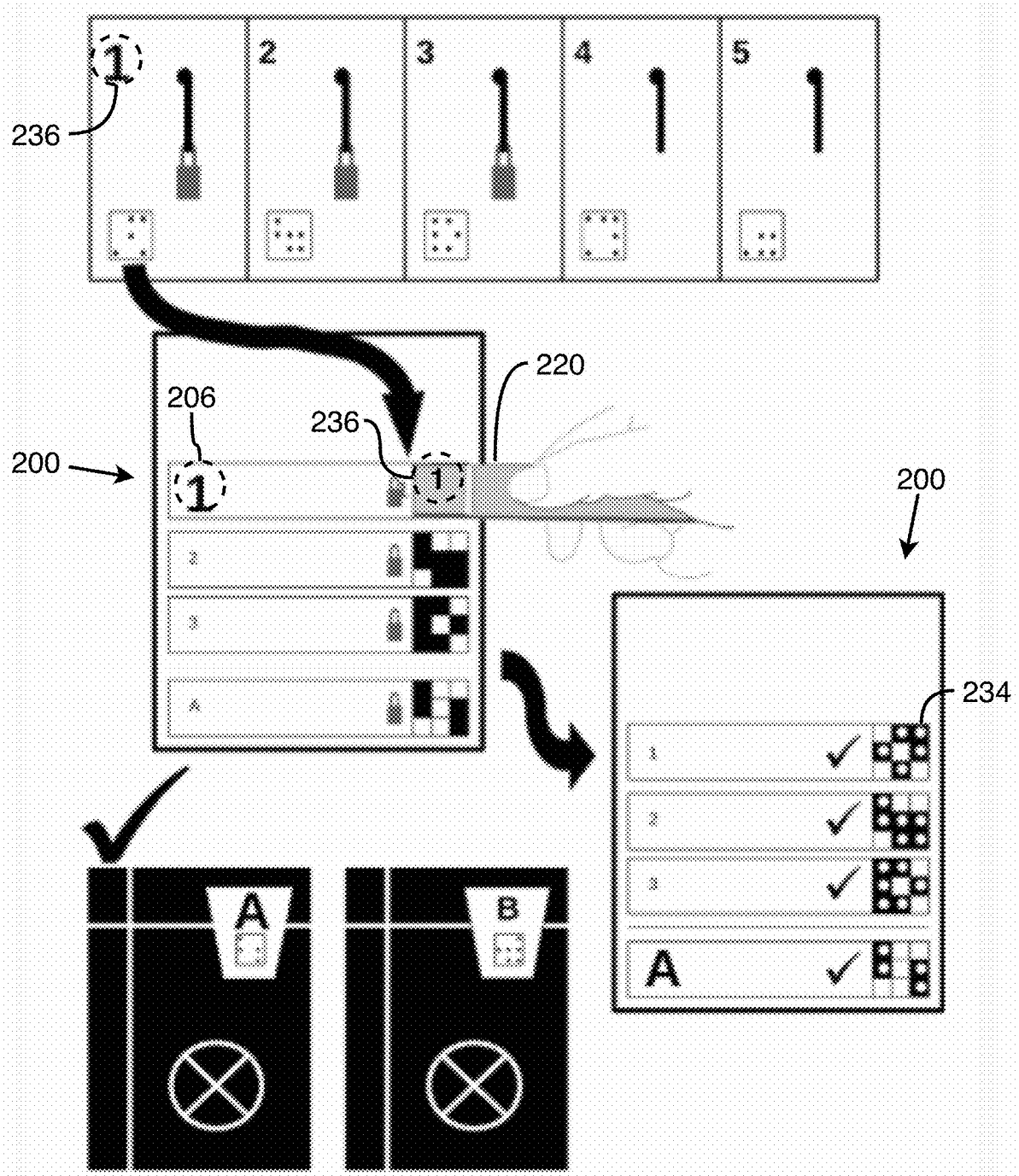
FIG. 6 is a schematic of steps performed with a securing procedure checklist and a marking tool when following a securing procedure.

Referring now to FIGS. 4 to 6, the present innovation is a method involving a modified securing procedure checklist 200 presenting elements 202 comprising graphical assemblages 210; and a series of marking tools 220 adapted for visual validation, which allows the operator to confirm the correspondence between the physical pieces of equipment and the pieces of equipment listed on the securing procedure checklist 200, and thus that the operator has assumedly completed all the operations associated with the right piece of equipment while passing through all of the right element(s) 202 of the securing procedure checklist 200.

Referring specifically to FIG. 4, the printed securing procedure checklist 200 used by an operator during a securing procedure comprises a series of elements 202, with a description of operation, aka a directive, and a unique graphical assemblage 210 individually associated with each of the elements 202. Each unique graphical assemblage 210 comprises a series of blocked spaces 212 and free spaces 214 assembled according to a pattern. The printed graphical assemblage 210 is further uniquely associated with the specific piece of equipment identified in the element 202 and on which one or more operation(s) must be performed according to the description provided.

A complete securing procedure checklist 200 is typically printed on cardboard, a sheet of paper, a sheet of laminated paper, or another appropriate substrate or markable support. The printed securing procedure checklist 200 comprises a listing of all of the elements 202 (being a number on the depicted example corresponding to the identifier of the piece of equipment, with the description of the action not depicted) associated therewith, with, for each element 202, a corresponding, typically unique, graphical assemblage 210. According to a preferred realization, the graphical assemblage 210 is located on the right side of the element 202 of the securing procedure checklist 200.

The securing procedure checklist 200 further comprises a listing of the securing articles necessary to complete the securing procedure.

The securing procedure checklist 200 also comprises the identification of the zone to be secured through the securing procedure. The zone is also provided as an element 202 with a unique graphical assemblage 210 associated therewith that provided a possibility of validation of the correspondence at the end.

In summary, the new securing procedure checklist 200 provides a tool to validate correspondence of all the elements, comprising all the pieces of equipment listed to be secured, all the locations listed to be secured, and the objective, aka zone or piece of equipment, the securing procedure aims to secure. The securing procedure checklist 200 further provides a validation tool that allows validating that all the right elements have been processed and that no element has been passed over, increasing the level of security of the securing process overall.

Referring specifically to FIGS. 5A and 5B, a first realization of the marking tool 220 comprises a pair of complementary arms 222-1, 222-2 joined together and movable toward each other to close over a substrate to be placed therein. The marking tool 220 comprises over the inner face 224 of the arm 222-1 a series of pins 232 adapted to generate markings, typically permanent markings, over a substrate with the pins 232 being assembled in a pattern matching either the graphical assemblage 210 associated with a piece-of-equipment or with a location. Operation of the marking tool 220 involves holding and pressing the arms 222-1, 222-2 against each other to punch the corresponding markings in a substrate placed in-between.

According to a preferred realization (not depicted), the marking tool 220 comprises an illustration thereon of its graphical assemblage to be matched therewith. According to realizations, the illustration is provided through an engraving over the outer face 226 of one of the arms 222, a sticker glued to the outer face 226 of one of the arms 222, or a label attached to the marking tool 220.

According to a preferred realization (see FIG. 4), the marking tool 220 comprises an identifier 236 corresponding to the identifier 206 of an associated piece of equipment. According to realizations, the identifier 236 is provided through an engraving over the outer face 226 of one of the arms 222, a sticker glued to the other face 226 of one of the arms 222, or a label attached to the marking tool 220.

According to a preferred realization (not depicted), the marking tool 220 comprises attaching means, e.g., a chain, adapted to permanently or releasably attaching the marking tool 220 to the piece of equipment associated therewith, or to the identification tag of the piece of equipment to which the marking tool 220 is associated with. According to a realization, the attaching means is not permanent but provides a solution, e.g., a holder, preventing the marking tool 220 to be displaced away from the piece of equipment.

According to a realization (not depicted), the marking tool 220, when adapted for heavily controlled environments, comprises a reservoir for collecting material, e.g., punched pieces of the substrate, removed from the substrate when marking the securing procedure checklist 200.

According to a realization (not depicted), the marking tool 220 may comprise a sheet aligning feature such as a transparent portion helping in aligning the marking tool 220 over the securing procedure checklist 200, and/or a shoulder to press the edge of the securing procedure checklist 200 against to adjust the depth at which the securing procedure checklist 200 must be sled between the arms 222 of the marking tool 220.

According to a realization (not depicted), the marking tool 220 may comprise one or more additional reference marking elements distinct from the pattern-generating pins 232, common to all marking tools 220, that aim to validate other parameters such as the orientation of the marking tool 220, the position, e.g., depth, etc. of the marking tool 220 relative to the substrate when the operator marks the substrate. Examples of the reference marking(s) include a logo, e.g., an enterprise logo, an icon, e.g., a padlock icon, and other shapes, e.g., an arrow, that is distinct from the pattern-generating pins and that allows someone to validate that the operator did not trick the procedure by placing the marking tool 220 otherwise than expected relative to the substrate, or that the operator used more than once the marking tool 220 over the substrate in relation with a pattern for examples.

Throughout the present description, the graphical assemblage 210 is illustrated as a matrix comprising an equal number, e.g., three (3), of rows and columns. Such an example provides a possibility for about two hundred and fifty (250) distinct markable graphical assemblages 210 since the selection of usable patterns is selected to avoid confusing patterns (e.g., mirror patterns, confusion between marking the dark cells when the operator should mark the white cells, etc.).

Alternative realizations may comprise another number of rows, another number of columns, or both. According to a realization, the number of rows is different from the number of columns.

Alternative realizations encompassed all structures of graphical assemblages having a potential to easily provide markings that are easy to compare with the pattern for validation of correspondence.

For example, alternative realizations may comprise variations in the shapes to be marked and the associated shape of the markings, e.g., square, circle, slit extending over a plurality of positions of the pattern, etc.

Alternatives comprise the use of color (e.g., red and green) to print the pattern, the marking of darker-color cells (as illustrated), the marking of lighter-color cells, the use of reference cells that either must always be marked or at the opposite must never be matched. An example of the latter is the use of additional first and last rows that are always dark-color cells. Other techniques related to barcodes and QR codes are also encompassed therethrough.

In must be noted that the present system and method may be associated with other known solutions to improve security level in the workplace. Examples of such solutions comprise displays installed according to the securing procedure, signal lights being activated when completing a securing step (ex. turning off a circuit resulting in activating a signal light in the vicinity of the breaker or of a piece of equipment depending from the circuit to be fed with energy), physical hindering preventing the securing operation or access to the marking tool 220 without being moved and thus preventing marking without completion of the securing step and/or automatically signaling a change of lockout state when accessing the marking tool, a dial or other energy-level indicator, an interactive display, a SECURED display associated with a location, and signals transmitted to operators through, e.g., personal device such a smart phone. Accordingly, complementary signaling solutions to the present system and method are herein contemplated.

Figure 7:
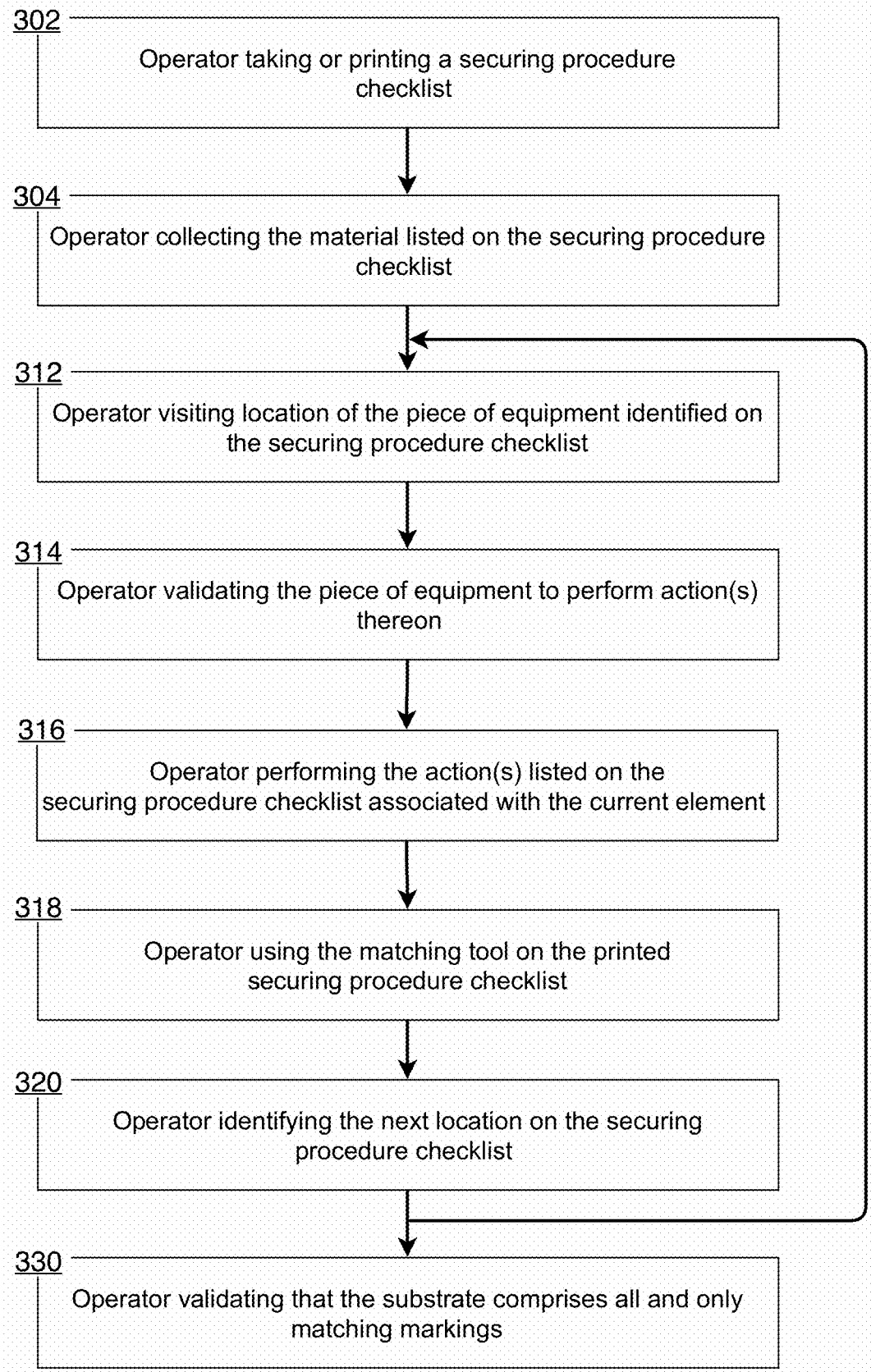
FIG. 7 is a flow chart of steps performed by an operator when following a securing procedure with a securing procedure checklist and a marking tool in accordance with an embodiment.
Figure 8:
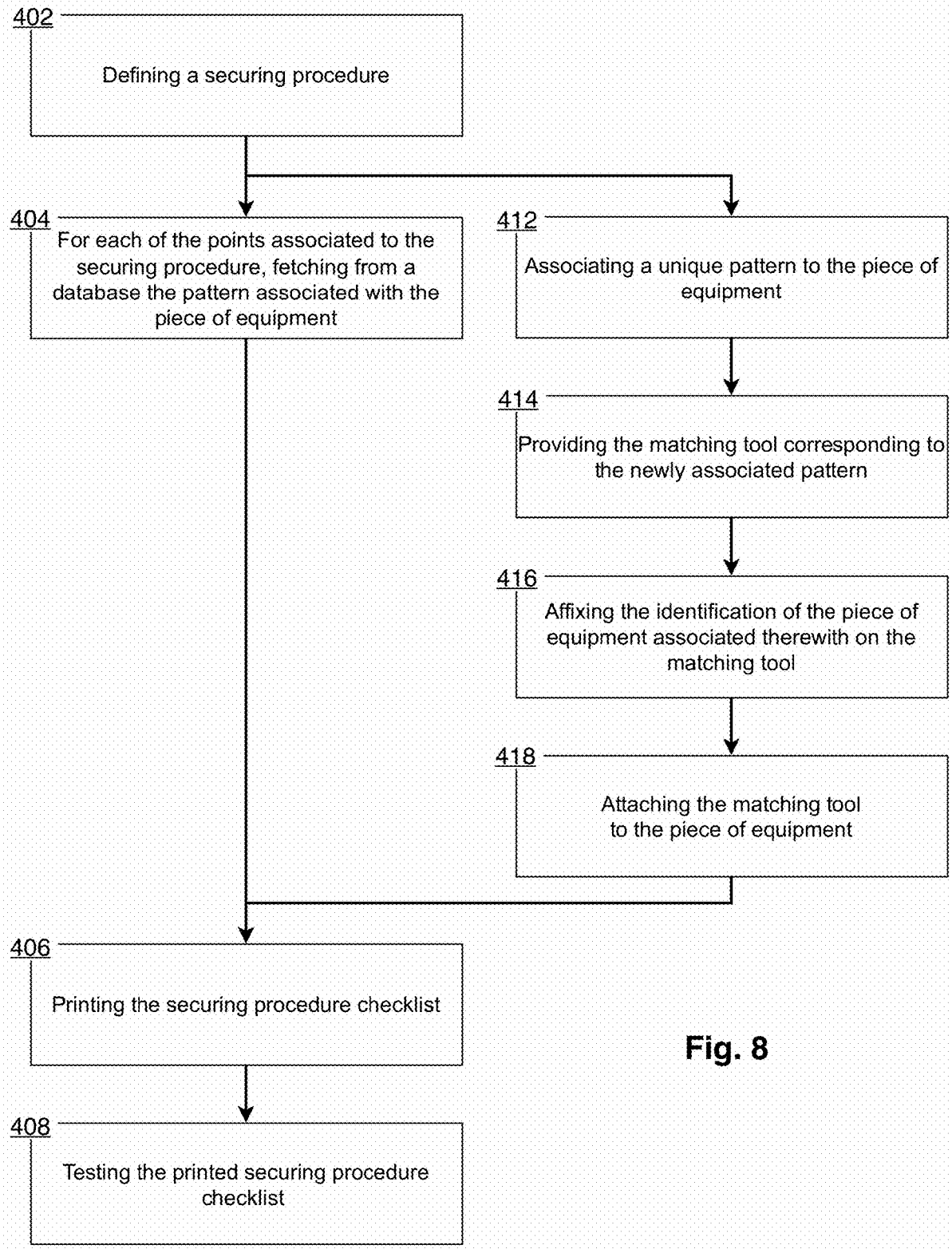
FIG. 8 is a flow chart of steps performed when generating a securing procedure to be performed using a securing procedure checklist and a marking tool such as one described herein.

Referring additionally to FIGS. 6 and 7, there is depicted a method of use of the present system. FIG. 6 schematically illustrates the physical realization of the use of the securing procedure checklist 200 and the marking tool 220. FIG. 7 provides the steps through a flow chart. The method of use of the present system comprises the following steps:

Step 302 comprises the operator printing and/or taking a securing procedure checklist 200 when the operator needs to perform a task requiring a zone to be secured through a security procedure.

Step 304 comprises the operator to collect the material, aka articles, listed on the securing procedure checklist 200 that are needed to perform the securing procedure.

Step 312 comprises the operator moving to the location of the piece of equipment to visit the piece of equipment identified and listed next in the listed order according to the securing procedure provided through the securing procedure checklist 200.

Next step 314 comprises the operator validating that the piece of equipment to perform action(s) thereon. The comparing step 314 comprises to visually compare the identifier 236 of the piece of equipment with the identifier 206 printed on the printed securing procedure checklist 200.

Step 316 comprises the operator performing the action(s) listed on the securing procedure checklist 200 that are associated with the current element 202. Such action(s) may include operating the piece of equipment such as turning a valve, turning off a breaker, placing a component under lockdown, placing a padlock, and installing a sign or a label as examples.

Next step 318 comprises the operator using the marking tool 220 on the printed securing procedure checklist 200 to generate permanent markings on the securing procedure checklist in association therewith, and thus to provide proof of the visit by the operator to the piece of equipment during the realization of the securing procedure (see FIG. 6). The step 316 comprises validating that the markings performed over the securing procedure checklist 200 match the graphical assemblage 210 printed on the printed securing procedure checklist 200 to validate that the process has been performed on the right piece of equipment. As discussed therein, in some cases the marking tool 200 may become accessible only through completion of part or the whole actions of step 316.

Next step 320 comprises the operator identifying the next element 202 of the securing procedure checklist 200 and repeating steps 312 to 318 for the next element(s) 202 of the securing procedure checklist 200 until all of the elements 202 on the securing procedure checklist 200 have been visited.

When actions associated with all elements 202 of the printed securing procedure checklist 200 are completed, the next step 330 comprises to validate that the substrate comprises all and only the markings 234, e.g., perforations, associated with all of the graphical assemblages 210 printed on the substrate (and optionally reference markings when used). If the pattern-associated markings 234, do not exactly match all of the printed graphical assemblages 210 of the printed securing procedure checklist 200, and when used the reference marking(s) do not match the expected markings, the operator must conclude that the securing procedure has not been performed adequately and that it is not safe to access the to-be-secured zone and to perform, e.g., maintenance operations.

Such a step also includes validating correspondence between the to-be-secured zone identified among the elements 202 of the security procedure checklist 200 and the physical zone using the same technique, namely validation through the use of identifiers and a matching between the graphical assemblage and the markings.

Finally, when the final validation has been performed, the operator is free to access the secured zone to perform, e.g., maintenance operations knowing that all potentially harmful energy sources associated therewith have been taken care of.

FIG. 6 depicts such a realization wherein the operator visits in listed order only the listed pieces of equipment, aka Equipment 1, Equipment 2, and Equipment 3; generates markings 234 over the securing procedure checklist 200 at each of the pieces of equipment; and completes the action(s) associated therewith. The securing procedure checklist 200 finally lists that the operator is free to access Zone A, aka work on Equipment A, with the visual graphical assemblage 210 providing a visual aid in avoiding confusion with the zone associated with e.g., Equipment B which, if the operator would confuse it with the zone associated with Equipment A, would potentially result in a dangerous situation.

It should be noted that the operator visiting an unlisted piece of equipment, e.g., Equipment 4 or Equipment 5, would result in unmatching markings on the securing procedure checklist 200 that would inform the operator that one piece of equipment not intended to be operated according to this securing procedure, what would potentially result in negative impacts on other operators or pieces of equipment. Thus, the present procedure aims to prevent both unintentionally unperformed steps and unnecessary steps; all being possible to validate afterward.

It should be noted that the expression "piece of equipment" is used broadly in the present description to comprise a location, machine, or device.

Figure 9:
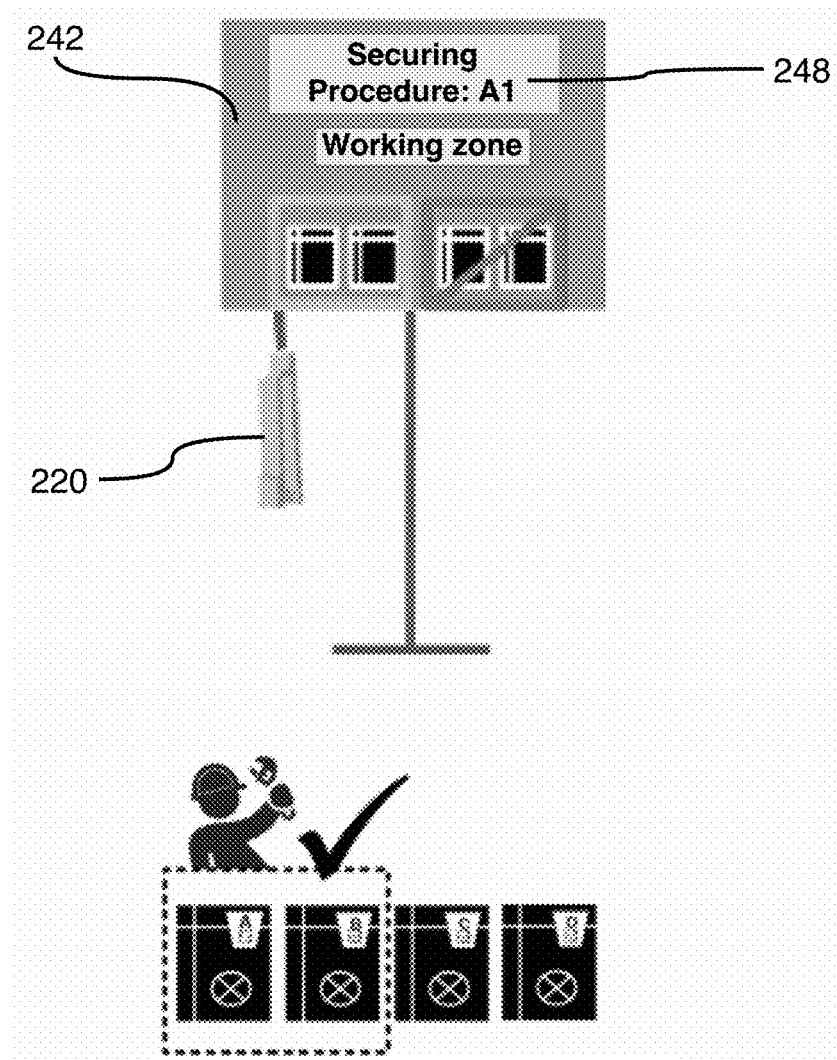
FIG. 9 is a schematic depicting a display associated with secured zones.

Referring to FIG. 9, according to a realization, organizations may provide a display 242 that depicts the pieces of equipment secured through procedures and the pieces of equipment not secured by the same procedure. The display 242 may also provide identification of the securing procedure 248 associated therewith For example, display 242 identifies that, through securing procedure A1 248, Equipment A and Equipment B, 244, are secured while Equipment C and Equipment D, 246, are not secured. According to the example, the marking tool 220 may be attached to the display 242 for validation of work on Equipment A or Equipment B, or alternatively, the use of the marking tool 220 associated with the display 242 on the securing procedure checklist 200 may be mandatory to demonstrate that the operator has read the information in relation with Equipment A or Equipment B, e.g., that the securing procedure associated with Equipment A and Equipment B, 244, do not apply to Equipment C and Equipment D, 246.

Securing Procedure Applied to Collective

According to another realization, a hierarchical organization comprises security officers and operators. Each security officer has a securing procedure checklist 200 with a list of elements 202 to take care of to secure a set of zones, with the number of pieces of equipment listed on a securing procedure checklist 200 summing up to, e.g., one hundred (100) pieces of equipment and locations to place under lockout. The last element 202 of the securing procedure checklist 200 of the security officer is to provide a piece of equipment, e.g., a hasp, with a unique marking tool 220 associated therewith in a location accessible to the operators.

Operators having to perform, e.g., maintenance operations in zones, instead of having to perform a long securing procedure, may perform a short securing procedure comprising two elements 202: a. performing a lockout over, e.g., the hasp of the security officer associated with the zone (with a correspondence that may be validated like physical pieces of equipment using identifier and match between the marks performed with the marking tool and the pattern on the securing procedure checklist 200); and b. validating the zone in the same fashion.

This procedure provides the advantage of speed, of low technological requirements, of providing a low level of failure and of providing a validation tool.

Figure 10:
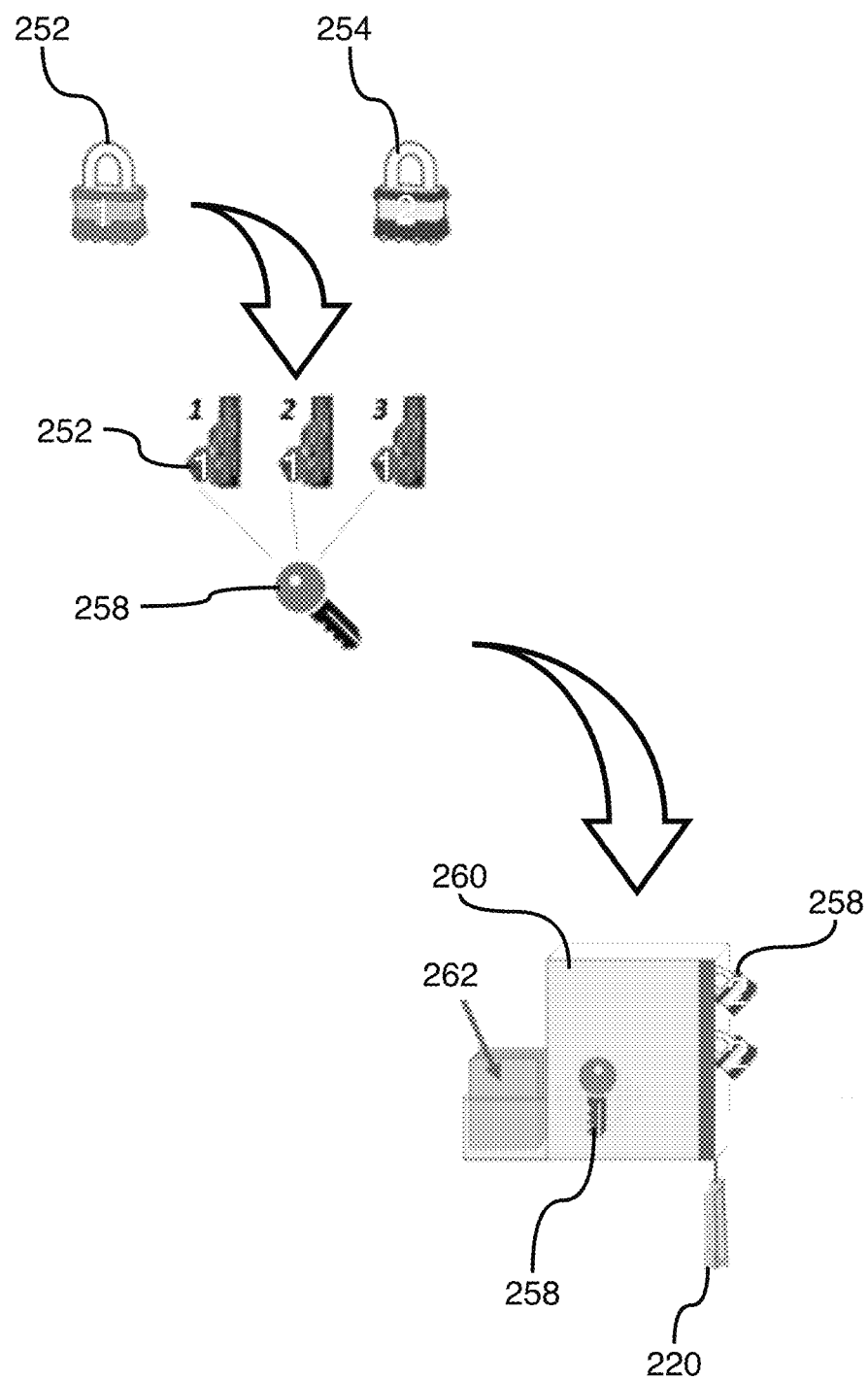
FIG. 10 is a schematic depicted means and steps associated with an officer's securing procedure checklist.
Figure 11:
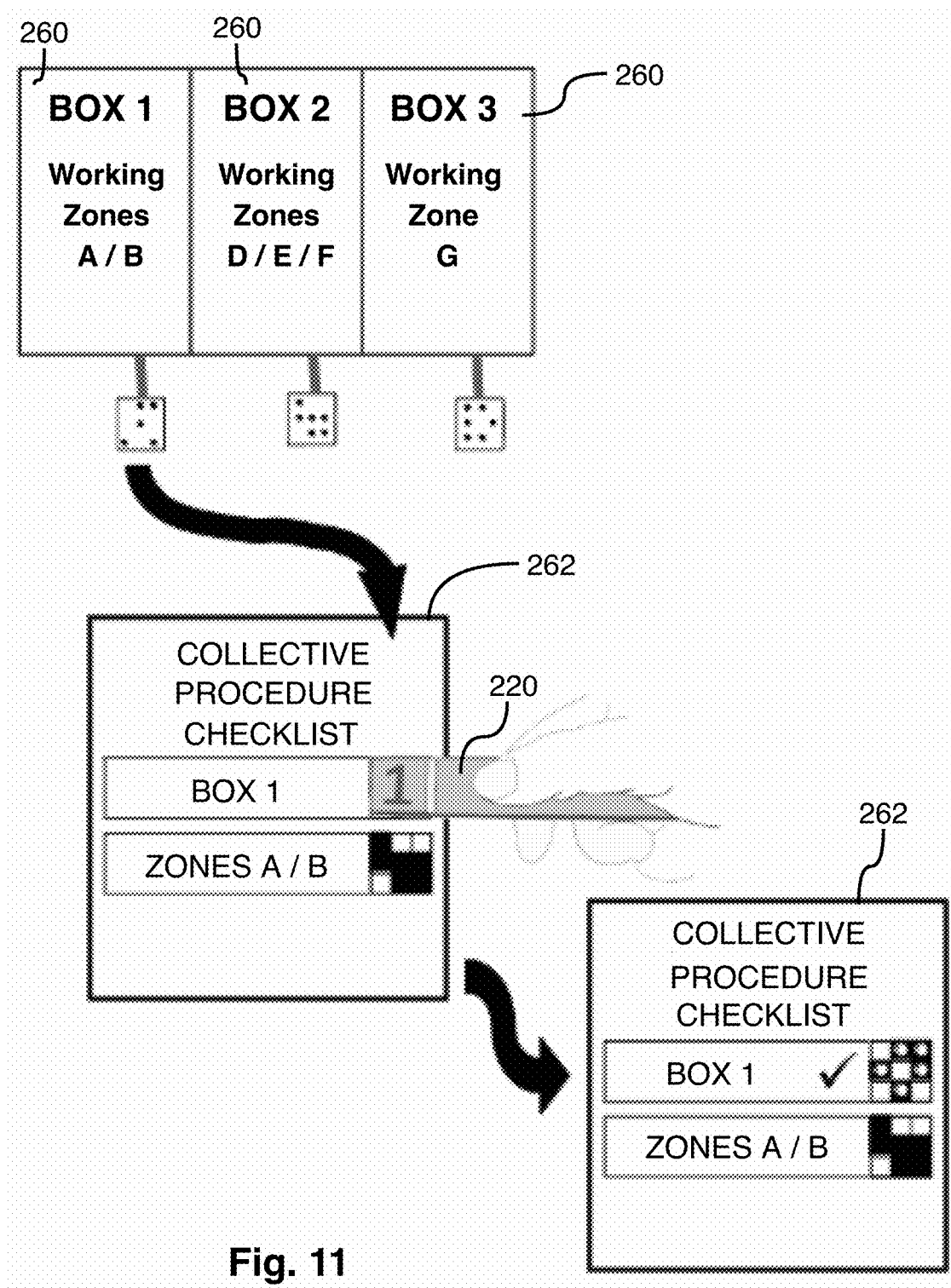
FIG. 11 is a schematic of a plurality of collective security boxes and steps associated therewith.
Figure 12:
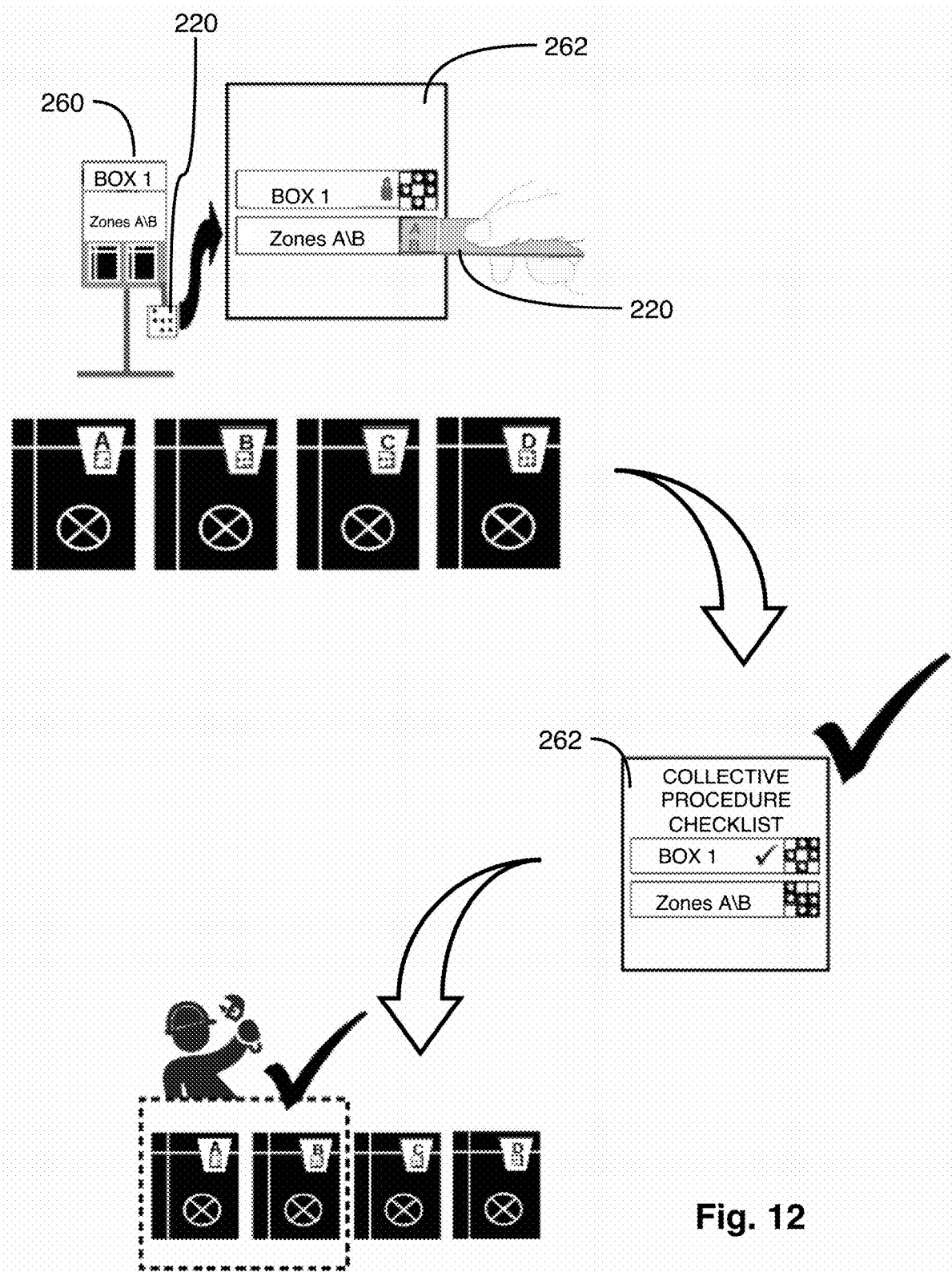
FIG. 12 is a schematic depicting means and steps associated with an operator's securing procedure checklist depending on an officer's securing procedure checklist.

FIGS. 10 to 12 depict such an exemplary realization wherein two types of padlocks are used: a) officer padlocks 252, depicted padlocks 1, and operator padlocks 254, depicted padlocks 2.

Following an officer securing procedure to secure a series of equipment, an officer locks, e.g., three pieces of equipment 256 using three officer padlocks 252 (unlockable with the same officer key 258).

It should be noted that, even if not depicted per se, like all herein discussed securing procedures, the officer uses a securing procedure checklist 200 and marking tools 220 to validate the appropriate completion of the securing procedure checklist 200.

Once all the pieces of equipment 256 associated with the officer securing procedure are locked, the officer places the officer key 258 in a collective security box 260. The officer further places securing sub-procedure checklists 262 and a marking tool 220 therewith.

Referring additionally to FIG. 11. FIG. 11 depicts an example wherein many collective security boxed 260 are located side-by-side, each associated with one or more distinct zones.

According to realizations, a plurality of different sub-procedure checklists 262 may depend on the completion of the same officer securing procedure.

Referring now particularly to FIG. 12. When an operator has to work on a piece of equipment secured through an officer securing procedure, the operator may validate that the same key 258 is locked in the collective security box 260, take a sub-procedure checklist 262, place a personal operator padlock 254 on the collective security box 260, mark the sub-procedure checklist 262 with the marking tool 220, and pass to the next steps listed on the sub-procedure checklist 262 leading to the secured zone.

It should be noted that, according to that process, the officer will not be able to retrieve the officer key 258 until all operators are done working in zones secured therethrough; their operator padlocks 254 preventing the officer to access the officer key 258.

According to this system, many structures may be defined, with long-security procedures covering one or more zones, and a security officer being responsible for one or more long securing procedures (each having a unique marking tool associated therewith).

Process of Generating Securing Procedure

Referring now to FIG. 7 for the steps in generation a securing procedure.

Steps of preparing a securing procedure to be performed using the present system comprise the following steps:

Step 402 comprises defining a securing procedure, comprising identifying all the pieces of equipment involved in the securing procedure and the securing articles involved.

Step 404 comprises, gathering each of the elements 202 associated with the securing procedure, comprising either to fetch from a database the graphical assemblage 210 associated with the piece of equipment involved, or, generating a unique one when no graphical assemblage 210 is currently associated with the piece of equipment, Step 412 comprises associating a unique graphical assemblage 210 with the piece of equipment;

Step 414 comprises providing the marking tool 220 corresponding to the newly associated graphical assemblage 210;

Step 416 comprises affixing the identifier of the piece of equipment associated therewith on the marking tool 220; and Step 418 comprises attaching the marking tool 220 to the piece of equipment or in the vicinity, e.g., to the associated tag, of the piece of equipment.

Step 406 comprises printing the securing procedure checklist 200.

Step 408 finally comprises testing the printed securing procedure checklist 200 by visiting the pieces of equipment listed in the elements 202 of the securing procedure, and at each of the elements 202 using the marking tool 220 over the test securing procedure checklist 200. It further comprises comparing the markings 234, e.g., perforations, on the test securing procedure checklist 200 with the graphical assemblages 210.

The listed steps may be contemplated both for an operator's securing procedure and an officer's securing procedure alike. The distinction between an operator's securing procedure and am officer securing procedure involves the nature of the Equipment/Zone to be secured through the securing procedure, e.g., a specific piece of equipment versus one or more zones covering potentially numerous pieces of equipment, and the nature of the preceding elements listed on the procedure checklist, e.g., access to a collective security box, access to intermediary individual pieces of equipment.

The list further contemplated the division of the elements 202 into an officer's securing procedure checklist 200 (comprising all of the gathered elements of the procedure less the operations to be performed by the operator, aka remainder elements comprising description of the remainder operations) and an operator's securing procedure checklist 200 (comprising the remainder's elements), wherein the operator's securing procedure checklist 200 in that situation must refer to the officer's securing procedure checklist 200 through, e.g., a collective security box 260.

It is worth noting that even though the present system has been described in relation with a non-electronic realization, markings provided as punctures or punch holes, other realizations, electronic or not, are contemplated to provide a visual component that can be validated when visiting a piece of equipment and that provides a piece of permanent information on a printed securing procedure checklist 200 or otherwise following the visit. Examples of alternative realizations comprise printers and lasers, and the use of operator's electronic devices, even though these realizations are more expensive to operate than the described realization.

Further, accordingly, computers, tablets, smartphones and other electronic devices are herein contemplated as markable support to transport securing procedure checklists, access and compare content, aka elements, of the securing procedure checklist 200 with pieces of equipment, register (aka loading or inscribing) in memory of the electronic device or of a networked device, visits by the operator/device to the pieces of equipment listed on the securing procedure checklist 200, aka generate markings on the markable support that is the memory of the electronic device using a marking tool present on location, and to allow to validate later that the securing procedure has been followed by accessing the log of the procedure checklist stored on memory of the electronic device or on appropriate networked memory support.

Further embodiments of the present innovation comprise computing devices, e.g., computers, tablets, smartphones, etc., adapted to perform steps in generating securing procedure, generation procedure checklists, and the completion of the securing procedure checklist when visiting pieces of equipment and/or office security boxes.

Further embodiments comprise memory means comprising codes that, once loaded on a computing device, results in the computing device performing one or more of the processes listed hereinbefore.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for validating, using a procedure checklist, that a procedure is followed by an operator, comprising:
the procedure checklist printed over a markable support, comprising:
a first element printed thereon comprising a first graphical assemblage;
a second element printed thereon comprising a second graphical assemblage that is different from the first graphical assemblage;
a first marking tool adapted to generate markings on the support matching the first graphical assemblage, wherein the first marking tool is provided at a first location associated with the first element of the procedure checklist; and
a second marking tool adapted to generate markings on the support matching the second graphical assemblage, wherein the second marking tool is provided at a second location associated with the second element of the procedure checklist,
wherein the operator following each of the elements of the procedure uses the marking tools at the locations to generate markings on the support, and
wherein following of the procedure is validated by comparing the markings generated on the support with the first graphical assemblage and the second graphical assemblage.

2. The system of claim 1, wherein the first element comprises an identifier used to identify one of a piece of equipment and a location associated with the element.

3. The system of claim 2, wherein the first element comprises a description of a first operation of the procedure.

4. The system of claim 3, wherein the first operation is to be performed at least one of a) on the piece of equipment and b) at the location associated to the element.

5. The system of claim 1, wherein the marking tools are attached at the location.

6. The system of claim 1, wherein the markings comprise one of printing and punching.

7. The system of claim 1, wherein the markings comprise reference marking common to markings of the first marking tool and the second marking tool.

8. The system of claim 1, wherein the first marking tool comprises a matrix of pins operative to perforate the markable support.

9. The system of claim 1, wherein the markable support comprises one of a cardboard, a sheet of paper and a sheet of laminated paper.

10. The system of claim 1, further comprising a padlock to be installed at the first location.

11. A method for an operator to perform a procedure following a procedure checklist comprising:
providing the operator with the procedure checklist comprising:
a first element comprising a first operation description and a first graphical assemblage;
a second element comprising a second operation description and a second graphical assemblage that is different from the first graphical assemblage;
for each of the elements of the procedure checklist, having the operator:
accessing a location associated with the element;
performing the operation described in the element; and
generating markings associated with the element of the procedure checklist with a marking tool available at the location,
wherein following of the procedure is validated by comparing the markings generated over the procedure checklist with the graphical assemblages.

12. The method of claim 11, wherein the procedure is to be performed one of a) on a piece of equipment and b) at the first location.

13. The method of claim 11, wherein marking the element of the procedure checklist comprises one of a) printing on a markable support and b) punching the markable support.

14. The method of claim 11, wherein marking the element of the procedure checklist comprises generating reference markings on a markable support, wherein the reference markings are common to the markings to be generated with a first marking tool and the markings to be generated with a second marking tool.

15. The method of claim 11, further comprises validating the following of the procedure by the operator, for each of the elements of the procedure checklist, by comparing the markings generated over the procedure checklist with the graphical assemblages of the procedure checklist.

16. The method of claim 11, wherein the procedure checklist is one of a) printed on one of a cardboard, a sheet of paper and a sheet of laminated paper and b) stored in memory of an electronic device.

17. A method of generating a first procedure checklist, comprising:
gathering a list of operations to be performed at different locations during a procedure;
generating the first procedure checklist comprising a list of elements, each one of the elements comprising:
a description of an operation to be performed at a location from the list of operations;
a unique graphical assemblage associated with the location of the operation to be performed;
inscribing the first procedure checklist on a markable support transferrable to an operator,
wherein, at each location where one of the operations of the list of operations is to be performed, a marking tool adapted to generate markings on the markable support matching a graphical assemblage is available,
wherein each one of the marking tools is adapted to generate the unique graphical assemblage associated with its location, and
wherein following of the procedure is validated by comparing the markings generated over the st procedure checklist with the graphical assemblages.

18. The method of claim 17, wherein each one of the elements comprises an identifier used to identify at least one of a) a piece of equipment and b) one of the locations.

19. The method of claim 17, wherein inscribing the first procedure checklist comprises one of a) printing the first procedure checklist on one of a cardboard, a sheet of paper and a sheet of laminated paper, and b) loading the first procedure checklist in memory of an electronic device.

20. The method of claim 17, further comprising generating a second procedure checklist from the list of operations,
wherein the first procedure checklist comprises description of all of the operations of the list of operations less remainder operations, and
wherein the second procedure checklist comprises an element comprising a reference to the first procedure checklist and additional elements comprising descriptions of the reminder operations.

* * * * *